United States Patent Office 2,815,093
Patented Dec. 3, 1957

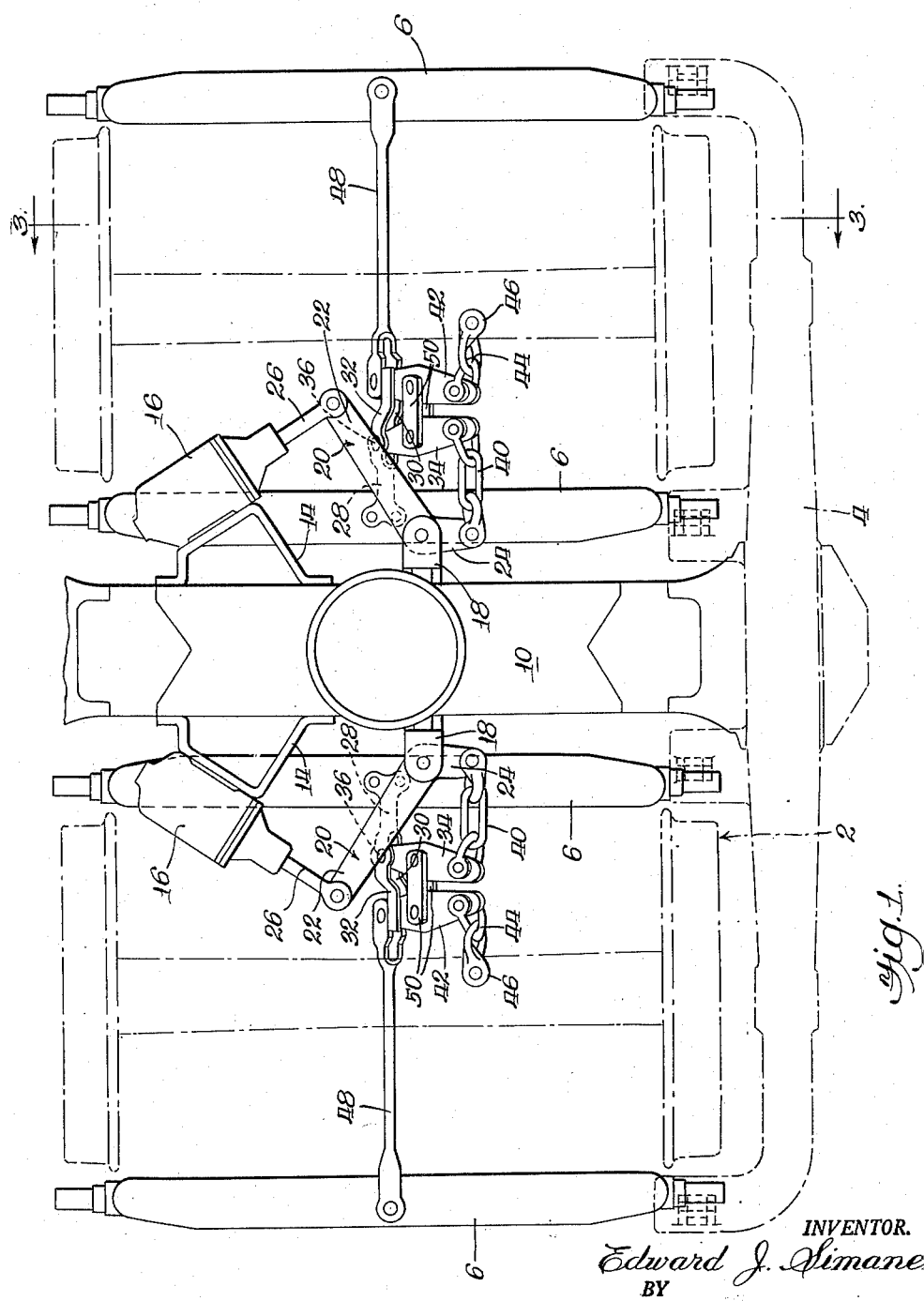

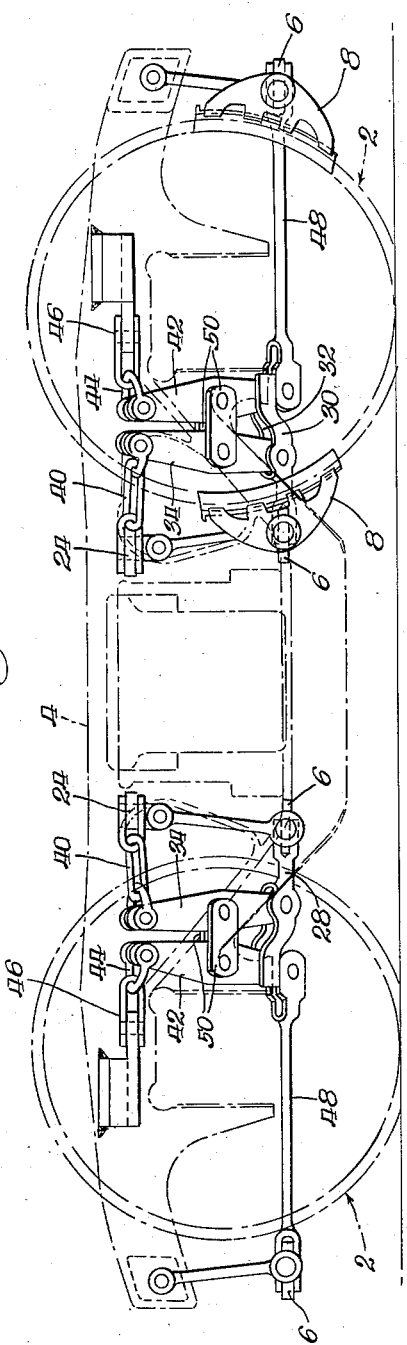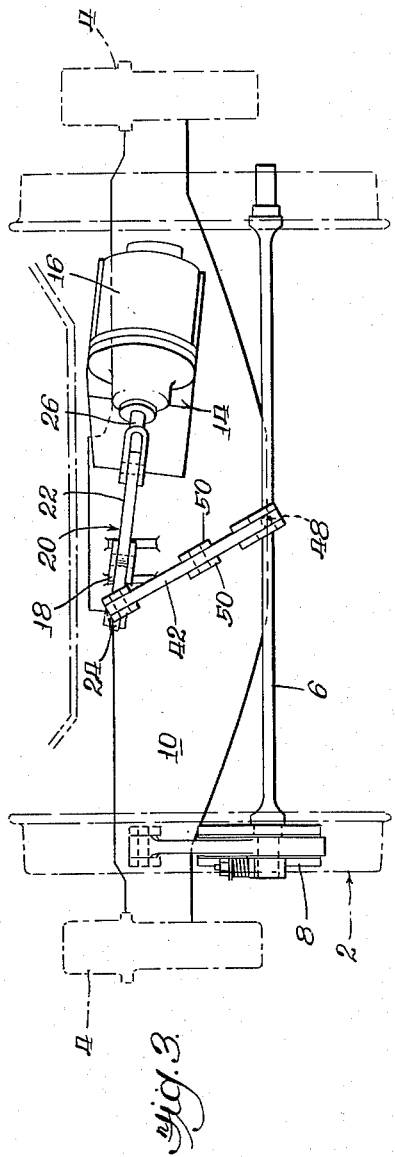

2,815,093

BOLSTER MOUNTED CLASP BRAKE ARRANGEMENT

Edward J. Simanek, Chicago, Ill., assignor to American Steel Foundries, Chicago, Ill., a corporation of New Jersey Application April 14, 1954, Serial No. 423,068

5 Claims. (Cl. 188—56)

The invention relates to a railway car brake and more particularly to that type of brake known as a clasp brake.

The invention comprehends utilizing a bolster mounting for a unit cylinder which, in turn, is operative to actuate a braking system for a wheel and axle assembly of a conventional railway car truck. Additionally, the invention comprehends a novel multiple cylinder mounting and novel linkage arrangement associated with each cylinder whereby the braking mechanism associated with an adjacent wheel and axle assembly may be actuated.

Accordingly, it is a primary object of the invention to provide a conventional railway car truck with a novel bolster-mounted clasp brake actuating mechanism.

It is an additional object of the invention to provide a novel linkage arrangement for actuating a brake mechanism of the type described.

It is a specific object of the invention to provide a novel bell crank-brake lever arrangement to actuate a pair of brake beams which carry on their ends brake shoes which, in turn, clasp the wheels of the related wheel and axle assembly.

These and other objects of the invention will become apparent in the course of the following description and from and examination of the concerned drawings, wherein:

Figure 1 is a fragmentary top plan view of a railway car truck having the novel brake mechanism incorporated therewith;

Figure 2 is a fragmentary side elevational view of the structure shown in Figure 1, and Figure 3 is a fragmentary sectional view taken along line 3—3 of Figure 1.

Describing the invention in detail, the truck comprises a pair of wheel and axle assemblies indicated generally at 2, said assemblies carrying in the usual manner (not shown) a frame 4. A pair of brake beams 6 are mounted on opposite sides of each wheel and axle assembly 2, said brake beams carrying on the extremities thereof brake head-brake shoe assemblies 8 which are arranged to engage the tread of the associated wheels of the assemblies 2. It will be noted that the brake beams are so arranged that the break heads clasp the related wheels.

A bolster 10 is mounted centrally on a truck and extends transversely thereof, having its opposite ends spring supported (not shown) from the truck frame. Brackets 14, 14 are provided on opposite sides of the bolster 10 offset laterally from the central position of said bolster, said brackets 14 providing mountings for brake cylinders 16, 16. It should be noted that the brackets 14 are so arranged that the longitudinal axes of the mounted brake cylinders 16 when extended intersect the transverse vertical center-plane of the bolster 10 at an acute angle.

Bosses or brackets 18, 18 are also carried on opposite sides of the bolster 10 in spaced relation with the brackets 14, said mounting brackets 18 serving to pivotally carry related bell crank levers 20, 20. It will be noted that the bell crank levers 20 are pivotally fulcrumed to the brackets 18 intermediate their ends and form arms 22 and 24 which extend from the point of fulcrum and are arranged angularly relative to each other. Piston rods 26, 26 extend from the inboard ends of the actuating cylinders 16 and are pivotally connected to one end of the arms 22 of the related bell crank levers 20.

Directing attention to the right hand wheel and axle assembly of the truck as seen in Figure 1 it will be noted that the brake beam 6 on the left hand side thereof has affixed to its central portion a bracket link 28. The bracket link 28 extends inwardly toward the axis of the adjacent wheel and axle assembly 2 and forms a pair of spaced plates 30 and 32. Plates 30 and 32 receive therebetween the lower extremity of a live brake lever 34. Pivotal connection is made at 36 between the lower end of the live brake lever 34 and said plates 30 and 32. The live brake lever 34 extends generally upwardly and is provided at its upper extremity with a link connection as at 40 with the end of the arm 24 of the bell crank lever 20. Another brake lever 42 is positioned immediately adjacent to first mentioned brake lever 34 and arranged in approximately the same vertically extended plane. The upper extremity of the brake lever 42 is pivotally connected to a clevis 44 which, in turn, is connected to a link which has a fixed connection to the car body fragmentarily illustrated at 46 in Figure 2. This link connection 44 gives a substantially fixed pivot or fulcrum for the upper end of the brake lever 42. The lower end of the brake lever 42 is pivotally connected to one end of a rod 48, said rod 48 extending longitudinally of the truck and making fixed connection to the right hand brake beam 6 centrally thereof as best seen in Figure 1. Spaced plates 50, 50 interconnect the mid-portions of the brake levers 34 and 42.

It will also be noted that the bracket plates 30 and 32 extend beyond their point of connection to the brake lever 34 and loosely embrace the brake lever 42 adjacent to the lower end thereof, forming more or less of a guide for relative motion between the brake levers 34 and 42.

It will be readily apparent from the above description and the disclosure in the drawings that the brake arrangement on opposite sides of the bolster 10 are substantially identical in that each operates as an individual unit clasp brake to decelerate the related wheels of the associated wheel and axle assembly 2.

The operation of the braking arrangement can be most easily understood by considering the arrangement shown in the right hand portion of Figure 1. Upon actuation of the cylinder 16 the piston rod 26 is urged outwardly from the cylinder causing the connected bell crank lever 20 to fulcrum in a clockwise direction about its associated fulcrum connection to the bracket 18. Movement of the bell crank lever 20 in a clockwise direction carries the link 40 to the left as seen in Figure 1 whereby the live brake lever 34 is urged to move and pivot leftwardly thereby bringing its lower end connection to the left hand brake beam 6 to the right. Movement of the lower end of the live lever 34 to the right carries the connected end of the left hand brake beam 6 to the right bringing the associated brake shoe assemblies 8 into engagement with the left side of the wheel and axle assembly as seen in Figure 1. Movement of the live brake lever 34 causes the dead brake lever 42 to pivot or fulcrum about the connection at its upper extremity. This movement of the lever 42 is to the left as seen in Figures 1 and 2 whereby the connected rod 48 is carried to the left bringing the right hand brake beam 6 and its carried shoes 8 into engagement with the right hand side of the wheels of their related wheel and axle assembly. The action above described is virtually simultaneous upon the actuating of the cylinder 16 with the result that the brake beam carried brake shoes are urged to clasp the related wheels and decelerate the truck. The action of the braking arrangement in the left hand side of Figure 1 is identical with that above described for the right hand side of Figure 1. Upon deenergizing the cylinder 16 above action is reversed and the brake shoe assemblies released from engagement with the related wheels.

I claim:

1. In a clasp brake arrangement for a railway car truck comprising a frame having a pair of longitudinally extending members interconnected by at least one transversely extending member, and at least one wheel and axle assembly supporting the frame, the combination of: a pair of brake beams disposed on opposite sides of said assembly and carrying brake means engageable therewith, a pair of generally vertically extending live and dead brake levers disposed between said beams, means interconnecting the respective brake levers, a pair of elements connecting the brake levers to the respective brake beams, the dead brake lever being fulcrumed at its upper end to the car, a power cylinder mounted on the transverse member and disposed between the longitudinally extending members with its operating axis forming an angle of substantially 30° with the longitudinal axis of the transverse member, and a dead bell crank cylinder lever fulcrumed intermediate its ends to the transverse member and having its opposite ends operatively connected to the cylinder and the upper end of the live brake lever, respectively, the connections between the bell crank lever and the cylinder, transverse member, and live brake lever all being in close proximity to each other.

2. A clasp brake arrangement according to claim 1, wherein the brake levers are interconnected intermediate their respective ends and wherein the brake levers are connected at their lower ends to the respective brake beams by tension elements.

3. A clasp brake arrangement according to claim 1, wherein the means interconnecting the brake levers comprises a tension member having its opposite ends pivotally connected to the respective brake levers.

4. A clasp brake arrangement according to claim 1, wherein the element connecting one of the brake levers to its related brake beam includes a portion presenting a slot guidably receiving the other of said brake levers.

5. A clasp brake arrangement according to claim 1, wherein the connection between the upper ends of the live and dead brake levers and the bell crank lever and car, respectively, are non-rigid connections.

References Cited in the file of this patent

UNITED STATES PATENTS

| | | |
|---|---|---|
| 2,084,074 | Baselt | June 15, 1937 |
| 2,086,842 | Baselt | July 13, 1937 |
| 2,215,239 | Baselt | Sept. 17, 1940 |